(12) United States Patent
Somma

(10) Patent No.: US 10,597,811 B2
(45) Date of Patent: Mar. 24, 2020

(54) WASHING OR WASHING/DRYING MACHINE COMPRISING AN ELECTRIC CURRENT GENERATOR

(71) Applicant: INDESIT COMPANY S.P.A., Fabriano (IT)

(72) Inventor: Pasquale Somma, Fabriano (IT)

(73) Assignee: Indesit Company S.p.A., Fabriano (IT)

( * ) Notice: Subject to any disclaimer, the term of this patent is extended or adjusted under 35 U.S.C. 154(b) by 722 days.

(21) Appl. No.: 15/105,237

(22) PCT Filed: Dec. 15, 2014

(86) PCT No.: PCT/IB2014/066905
§ 371 (c)(1),
(2) Date: Jun. 16, 2016

(87) PCT Pub. No.: WO2015/092646
PCT Pub. Date: Jun. 25, 2015

(65) Prior Publication Data
US 2016/0319476 A1    Nov. 3, 2016

(30) Foreign Application Priority Data

Dec. 18, 2013 (IT) .............................. TO2013A1040

(51) Int. Cl.
*D06F 39/00*     (2006.01)
*D06F 37/30*     (2020.01)
(Continued)

(52) U.S. Cl.
CPC ............ *D06F 37/304* (2013.01); *D06F 37/02* (2013.01); *D06F 37/203* (2013.01); *D06F 37/206* (2013.01); *D06F 39/006* (2013.01); *F16F 15/03* (2013.01); *H02K 1/34* (2013.01);

*H02K 7/1876* (2013.01); *H02K 7/1892* (2013.01); *H02K 35/02* (2013.01); *D06F 37/225* (2013.01); *Y02B 40/54* (2013.01)

(58) Field of Classification Search
None
See application file for complete search history.

(56) References Cited

U.S. PATENT DOCUMENTS

2011/0074162 A1    3/2011  Cottone et al.

FOREIGN PATENT DOCUMENTS

| CN | 101941670 A | 1/2011 |
|---|---|---|
| DE | 102013209209 | * 5/2013 |

(Continued)

OTHER PUBLICATIONS

English machine translation of DE102013209209.*

(Continued)

*Primary Examiner* — Michael E Barr
*Assistant Examiner* — Jason P Riggleman
(74) *Attorney, Agent, or Firm* — McGarry Bair PC

(57) ABSTRACT

The invention consists of a washing or washing/drying machine comprising a frame, an assembly constrained to said frame by constraint means that allow said assembly to oscillate relative to said frame, energy recovery means configured to transform kinetic energy in electrical energy, wherein said energy recovery means comprise a current generator configured to transform the oscillations of said assembly into an electrical current.

26 Claims, 4 Drawing Sheets

(51) Int. Cl.
| | |
|---|---|
| *H02K 7/18* | (2006.01) |
| *F16F 15/03* | (2006.01) |
| *H02K 35/02* | (2006.01) |
| *D06F 37/02* | (2006.01) |
| *D06F 37/20* | (2006.01) |
| *H02K 1/34* | (2006.01) |
| *D06F 37/22* | (2006.01) |

(56) References Cited

FOREIGN PATENT DOCUMENTS

| | | | |
|---|---|---|---|
| EP | 1997951 A1 * | 5/2007 | |
| EP | 2592183 A1 * | 10/2012 | |
| EP | 2592183 A1 | 5/2013 | |
| WO | 2010111376 A1 | 9/2010 | |
| WO | 2011045762 A1 | 4/2011 | |
| WO | WO-2011045762 A1 * | 4/2011 | ........... D06F 39/006 |

OTHER PUBLICATIONS

European Search Report for Counterpart TO2013A001040, dated Aug. 26, 2014.
International Search Report and Written Opinion of the International Searching Authority for Counterpart PCT/IB2014/066905, dated Mar. 20, 2015.
Maxwell Technologies, 3888 Calle Fortunada, San Diego, CA 92123, Maxwell Ultracapacitor Overview at http://www.maxwell.com/products/ultracapacitors/, accessed Jun. 7, 2016.

* cited by examiner

WASHING OR WASHING/DRYING MACHINE COMPRISING AN ELECTRIC CURRENT GENERATOR

CROSS REFERENCE TO RELATED APPLICATIONS

This application claims priority to International Application No. PCT/IB2014/066905, filed Dec. 15, 2014, which claims priority to Italian Application No. TO2013A001040, filed Dec. 18, 2013, the entirety of which are incorporated herein by reference.

BACKGROUND OF THE INVENTION DESCRIPTION

The present invention relates to a washing or washing/drying machine according to the preamble of claim 1.

As it is known, drying and washing/drying machines must fulfil increasingly stringent energy consumption requirements.

In order to comply with said requirements, washing machine manufacturers must increase the energy efficiency of electromechanical systems (motors and transmission) to the highest possible extent so as to ensure minimal power consumption during operation of the machine. Said consumption cannot, however, be reduced below a given minimum threshold value. Indeed, for a given washing cycle to be performed effectively, it is always necessary to use a minimum amount of energy to heat the washing liquid and rotating the rotary drum of the washing or washing/drying machine.

To achieve a reduction below said minimum threshold value, the person skilled in the art can use energy recovery systems allowing to recover the amount of energy that has been absorbed by the machine during its operation. In this way, the overall energy consumption of the machine can be reduced: the machine must always absorb an amount of energy that is greater or equal to the minimum threshold value, but the energy recovered through energy recovery means can be subtracted from said amount.

A solution for energy recovery is described in international patent application WO 2011/045762 A1 with priority date Oct. 15, 2009 by INDESIT COMPANY S.p.A. This document describes the means for energy recovery which are capable of recovering a portion of the kinetic energy of the rotary drum by braking the latter through a motor, wherein said motor can also act as a generator.

However, said solution does not recover all the kinetic energy which is wasted during washing machine operation.

SUMMARY OF THE INVENTION

A remarkable amount of energy is, indeed, wasted in the form of vibrations/oscillations of the tub containing the rotary drum during the various functioning stages (washing, centrifuge, stop, etc.).

The present invention aims to solve this and other problems by providing a washing or washing/drying machine that uses an electric current generator configured to transform the oscillations/vibrations of a washing or washing/drying machine tub into electrical current.

Further advantageous features of the present invention will be set out in the claims appended hereto.

DESCRIPTION OF THE DRAWINGS

These features as well as further advantages of the present invention will become more apparent from the description of an embodiment thereof as shown in the annexed drawings, provided by way of a non-limiting example, wherein.

DETAILED DESCRIPTION OF EMBODIMENTS OF THE INVENTION

Figure 1:
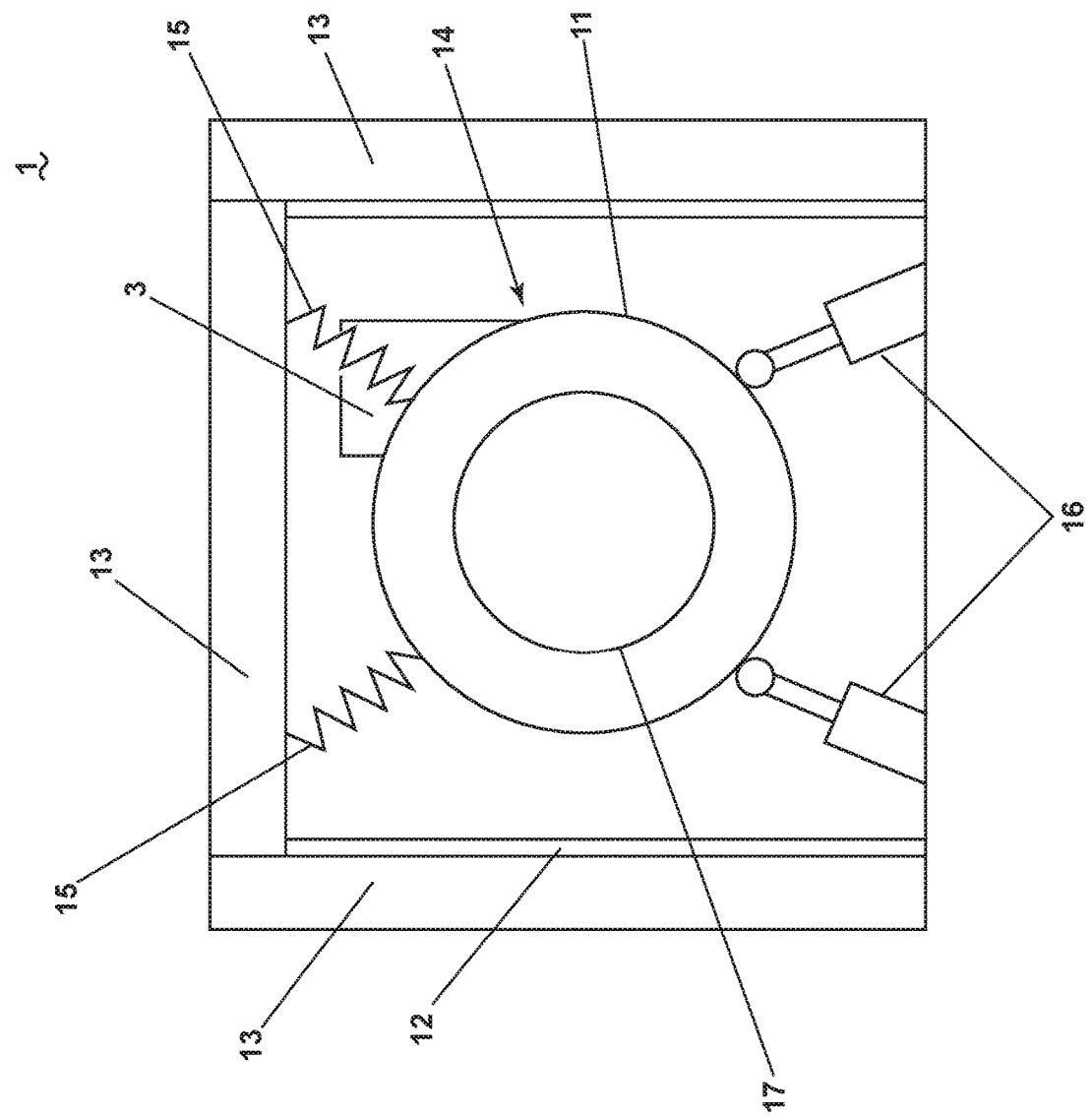
FIG. 1 illustrates a washing or washing/driving machine having a current generator according to one embodiment.

With reference to FIG. 1, a washing or washing/drying machine is shown comprising the following elements:

an outer casing comprising a frame 12 onto which the external covering panels 13 are fastened;

an oscillating assembly 14 located inside frame 12 and constrained thereto through constraining means or assembly preferably springs 15 and/or dampers 16, allowing said oscillating assembly 14 to oscillate with respect to said frame 12, said oscillating assembly comprising a tub 11 to contain the washing liquid and a rotary drum 17 placed inside said tub 11, within which a load can be placed, typically laundry items to be washed/dried, with the constraining means typically comprising a suspension system that suspends the tub to the frame 12, the suspension assembly typically comprising one or more springs 15 mounting an upper portion of the tub 11 to the frame 12 and one or more dampers 16 mounting a lower portion of the tub to the frame 12, and in some configurations the spring 15 and dampers 16 may be combined into one or more struts (not shown), as the frame 12 and oscillating assembly are standard in the art, they will not be further described.

energy recovery means comprising a current generator 2 configured for transforming the oscillations of the oscillating assembly into an electric current which can be used directly by the machine 1 and/or by the user to recharge electrical devices, such as batteries or capacitors, external or internal to machine 1.

Indeed, when the machine 1 is in its operating state, the drum rotation produces oscillations of the oscillating assembly; in particular, the tub 11 oscillates with respect to frame 12, since the laundry items inside the drum and the washing liquid inside tub 11 tend to settle in the lower portion of the drum and of the tub due to the gravity effect (i.e. in an eccentric position). This causes the unbalancing of the drum which, during rotation, causes the tub 11 to oscillate. The amount and intensity of oscillations depend on the speed of rotation of the drum, and they achieve maximum level during the centrifuge phase.

The generator 2 is built and configured for recovering the energy from said oscillations, advantageously increasing the energy efficiency of machine 1 and possibly advantageously reducing the amplitude of said oscillations.

In order to reduce the amplitude of oscillations of tub 11, the preferred embodiment of the machine 1 comprises at least a counterweight 3 that is rigidly fastened to the oscillating assembly, in particular to tub 11. To achieve such effect, the counterweight is positioned on the surface of tub 11 (preferably on the upper and/or anterior surface of the tub 11) so as to increase the moment of inertia of the entire oscillating assembly (tub, drum and others) and reduce the amplitude of oscillations. The counterweight 3 is made in material having a high specific weight such as cement or concrete.

The counterweight 3 can be fastened to the tub 11 by means of bosses obtained by moulding on the external surface of the tub 11 and devised to host an elastic element such as helix-shaped spring. Said bosses have longitudinal carvings (for example three longitudinal carvings) to allow their radial deformability upon spring insertion and they can be internally threaded so as to make insertion and removal easier. Advantageously, the counterweight has trunco-conical holes so that the boss deformation following spring insertion causes the blocking of the counterweight 3 on the tub 11.

Since the load and the washing liquids tend to concentrate on the bottom of the tub by virtue of gravity, the centre of mass of the oscillating assembly will be near the bottom of the tub 11 during the operation of the machine 1; therefore, vibration amplitude will reach a maximum value on top of the tub and an even higher value in the area where the counterweight 3 is located.

In order to advantageously maximise the generation of electrical energy by the generator 2, said generator 2 is positioned above (on top of) the tub 11, preferably within a cavity 31 created in said counterweight 3.

Figure 2:
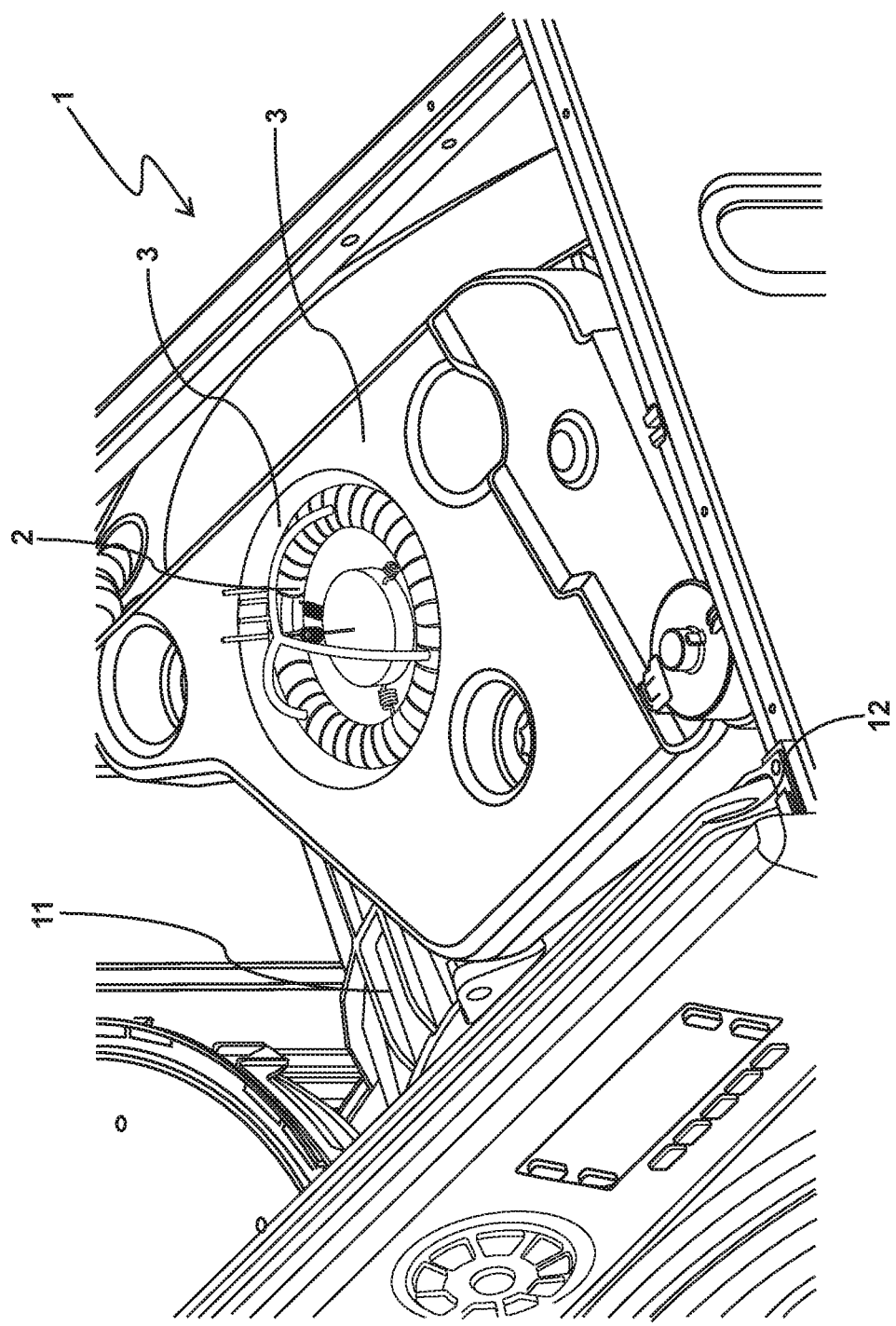
FIG. 2 shows an upper portion of the washing or washing/drying machine of FIG. 1 and illustrating the current generator located within a counterbalance weight.

With reference also to FIG. 2, the current generator 3 comprises the following parts:
- a stator core 21 being preferably made of a material having high magnetic permeability and low electrical conductivity, like for example ferrite or other similar materials, wherein said stator core is preferably shaped like a ring having a rectangular or square or circular or elliptic cross-section;
- a first winding 22, preferably made of enamelled copper wire, wound on said stator core 21, preferably around the external lateral surface of the ring of said stator core 21;
- a magnet 23, preferably made of neodite and having a cylindrical shape, which is movably associated with said stator core 21, preferably by means of an elastic constraining element, like for example a spring 25.

It has to be noted that the ring shape of the stator core 21 allows to position the magnet 23 at the centre of said core, thus advantageously maximising the magnetic flow within said core 21 and reducing magnetic flow dispersion. It has to be noted, moreover, that the rectangular or square section of said core 21 allows to wind the first winding 22 directly on the lateral external surface of the ring of said core 21 so as to advantageously maximise the electromotive force induced at ends 22a, 22b of said winding 22 by the variations in magnetic flow occurring in the core 21 and which are caused by the movement of magnet 23 relative to the core 21.

The machine 1 can also comprise a support 24 that is rigidly connected to said stator core 21 and so shaped as to surmount said core 21. This way, it is possible to connect the magnet 23 to said support 24 in such a way that said magnet 23 can move, e.g. oscillate, relative to the core 21.

To this aim, the generator 2 comprises a first elastic constraining element, preferably a spring 25, connecting the magnet 23 with the support 24.

The support 24 is advantageously made in a way that facilitates and enhances the movement, predominantly rotatory and alternate, of the magnet 23 relative to the core 21; said support 24 is made using three rods, preferably of metal or other material, curved, wherein the end of each rod is connected for example by means of electric welding, to a surface of the ring of the core 21, whereas the opposite ends of al rods are joined to each other in a common spot. To this spot, preferably by means of electric welding, an end of said spring 25 is attached, whereas the opposite end of said spring is attached, preferably by means of electric welding, to the magnet 23.

The spring 25 is advantageously attached to the centre of magnet 23, that is on a spot that is found on the central axis passing through the centre of mass of said magnet 23, this way the rotary alternate movement, which takes places mainly around an axis that lies on a surface containing the centre of mass of the magnet and perpendicular to the lateral surface of the ring of core 21, is minimally damped.

It is therefore possible for a person skilled in the art to use a support for the magnet 23 having a different shape than that just described, without anyway deviating from the teachings of the present invention.

The magnet 23, having a cylindrical shape, is preferably so configured as to have magnetic poles and the bases of magnet 23 mutually coincidental.

It is however possible for the person skilled in the art to use a magnet with a different pole configuration than that described above, without anyway deviating from the teachings of the present invention.

Under working conditions wherein the oscillating assembly (in particular tub 11) performs oscillations, the magnet 23 moves relative to stator core 21, tending to prevalently move rotary-wise and alternately as described above. In this way, the magnet 23 generates a variation in the magnetic flux concatenated by the winding 22 inducing an electromotive force in the ends 22a, 22b of said winding 22, thus enabling the passage of electric current through the latter; said electric current has an intensity and frequency that vary as a function of the types of oscillations made by the tub 11. Indeed, as the drum of the machine 1 rotates, the amplitude and frequency of the oscillations/vibrations, which the tub 11 performs relative to frame 12, depend on the type of washing load contained in the drum, on the quantity of washing liquid being present in said tub 11, on the drum rotation speed, on the intensity and direction of the torque applied by the motor actuating the drum, etc.

The electrical current generated by the generator 2 can be transformed into continuous current by means of a well-known rectifying circuit allowing to generate a continuous current whose electrical charge can be advantageously directly used by the machine 1 and/or stored. To this aim, the machine 1 can also comprise energy accumulation means capable of storing the electrical load transported by the continuous current generated by current generator 2; said electrical energy accumulation means can comprise a battery of the lithium-ions (Li-ion) or lithium polymers (Li-poly) type and/or super capacitors (like the Ultracapacitors manufactured by Maxwell—http://www.maxwell.com/ultracapacitors/), so that high discharge/recharge current can be managed without any problems with overheating of said accumulation means.

In an advantageous embodiment of the invention, the machine 1 comprises a voltage output connector, particularly for direct voltage, accessible by users, which is electrically connected to a rechargeable accumulator. In this way, the energy stored in the accumulating means can be advantageously retrieved and used, through said output connector, in order to provide a supply voltage to electrical devices eternal to machine 1, particularly to devices with low electricity consumption.

For example, the above-mentioned connector can be used to provide voltage to the battery of a mobile phone, or an mp3 player, or a laptop/palmtop and so on. In this way, apparent benefits are obtained in terms of energy saving in a household setting.

Moreover, the machine can also comprise a current inverter advantageously capable of generating an alternating electric current by directly or indirectly using the electric current generated by the rectifier circuit associated to the generator and/or using the electrical charge stored in the energy accumulating means. In this way, said alternating current can be used for supplying power to an electric load external to the machine 1, for example by sending to the grid the alternating current generated by the inverter.

Of course other numerous possible variants of the example described hitherto are possible.

Figure 3:
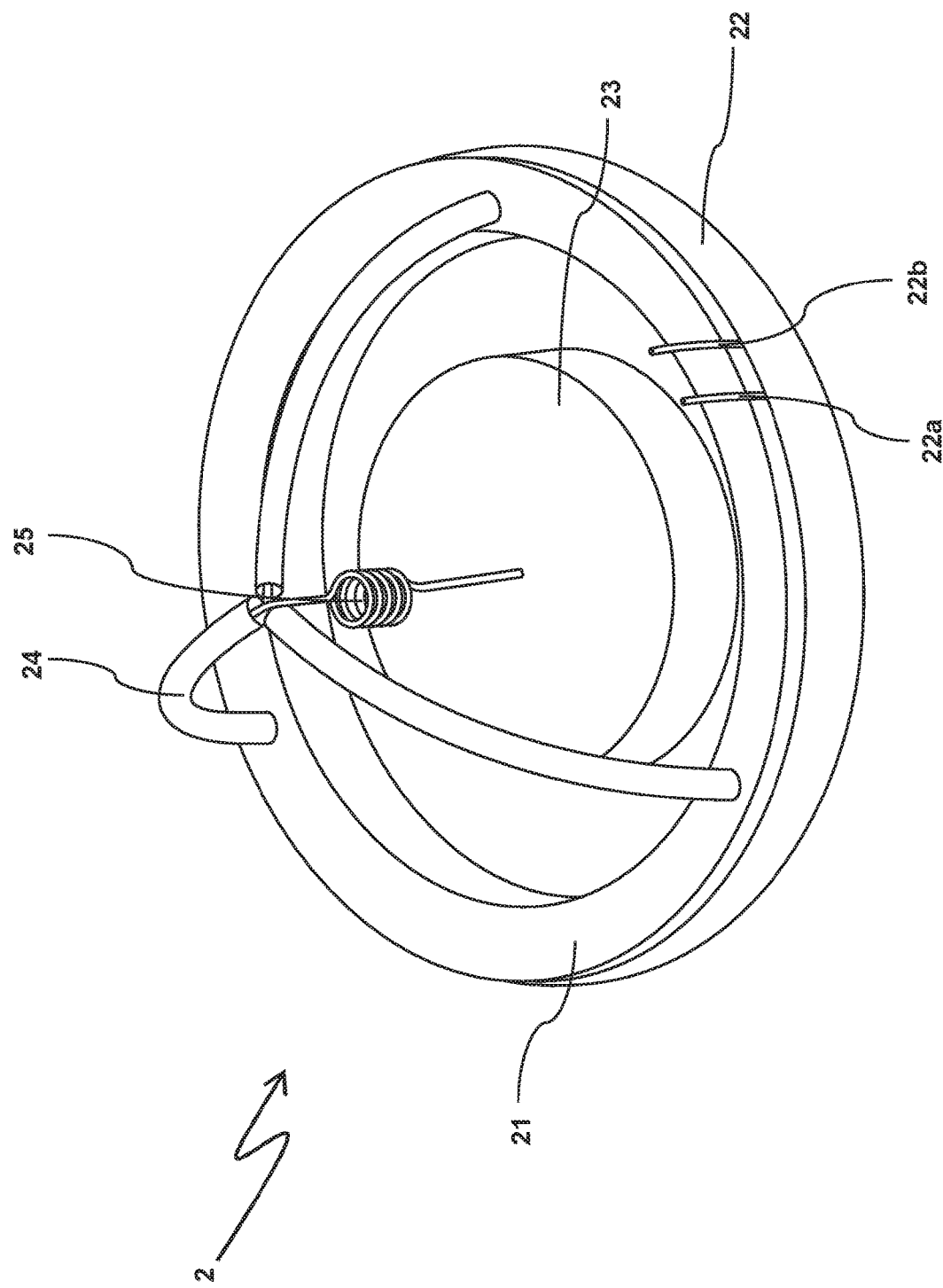
FIG. 3 shows the current generator used in the machine shown in FIG. 1.
Figure 4:
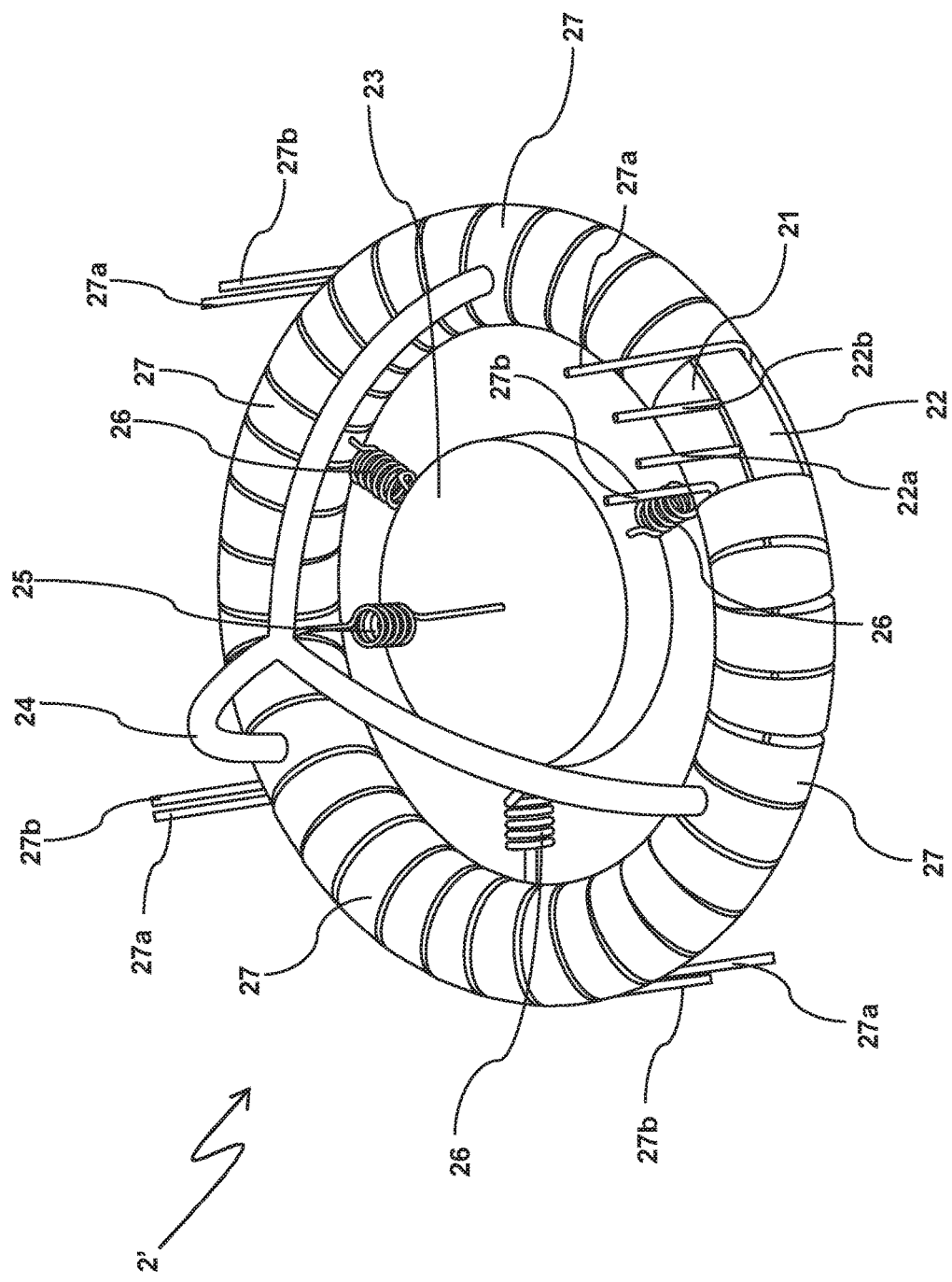
FIG. 4 shows a variant of the generator shown in FIG. 3.

A first variant is that described in FIG. 3: for the sake of briefness the following description will only highlight the parts distinguishing this and the following variants from the main embodiment described above; for the same reason, the same reference numerals with one or more apostrophes, where applicable, will be used to indicate structurally and functionally equivalent elements.

A first variant of the generator 2 described above comprises a generator 2' which, as an alternative to or in combination with the first winding 22, comprises at least one second winding 27 wound around the triangular or square or circular or elliptical section of the ring of said stator core 21. This second winding 27 allows to concatenate even the flow variations that are generated within the ring of the core 21 when the magnet 23 moves tending to rotate. By chain linking these magnetic flow variations, an electromotive force is generated at the ends 27a, 27b of the second winding, which can be used to generate an electric current that can be used in the same way as the current generated by the first winding 22 as previously described.

In order to maximise the power produced by the generator 2', said generator 2' can comprise four second windings 27, each one being wound around approximately one fourth of the length of the ring of said stator core 21. In this way, it is possible to avoid the nullification or reduction of the electromotive force due to opposite polarity electrical voltage. Indeed, should the second winding extend along the entire length of the ring of the core 21, the electromotive force generated will be almost null.

Each of the winding 22,27 is connected to a well-known rectifier circuit like the one used for the previous embodiment and the continuous voltage generated can be subsequently used in the same manner described for the previous embodiment.

The generator 2' comprises at least one second elastic constraining element, preferably three, associating the magnet 23 with the stator core 21; said second elastic constraining element preferably consists of a spring 26 whose first extremity is attached to the lateral surface of magnet 23, whereas the second extremity is attached to the lateral internal surface of the ring of stator 21. In order to advantageously minimize the damping of the rotary alternate movement of the magnet 23, the axis of the spring 26 and the attachment point of said spring 26 to the magnet 23 and to the core 21 lie on a plane that contains the magnet 23 centre of mass and which is perpendicular to the lateral surface of said magnet 23.

In this way, it is possible to stabilize the position of magnet 23 relative to core 21, so as to advantageously maximize the rotary alternate movement of magnet 23 without the latter being slowed down by said magnet 23 possibly bumping into the ring of the core 21 or the support 24. Said bumping, indeed, in addition to risking damaging the magnet 23, slow down the rotary alternate movement of said magnet, thus reducing electric current generation by generator 2' and, subsequently, the efficiency of the washing or washing/drying machine 1.

Other possible variants of the invention described hitherto, which fall within the scope of the following claims, are possible.

The invention claimed is:

1. A washing or washing/drying machine comprising:
a frame;
an oscillating assembly comprising a tub to contain a washing liquid, wherein the oscillating assembly is configured to oscillate relative to the frame in response to movement of the tub;
a counterweight rigidly fastened to the tub to oscillate with the tub; and
a generator mounted to the counterweight and configured for transforming the oscillation of the oscillating assembly into an electric current.

2. The machine according to claim 1, wherein said oscillating assembly further comprises a rotary drum located inside said tub.

3. The machine according to claim 2, wherein the generator is positioned above a surface of the tub.

4. The machine according to claim 3, wherein the surface is a top surface of the tub.

5. The machine according to claim 1 wherein the counterweight is applied to the outside of said tub.

6. The machine according to claim 5, wherein the counterweight is positioned on top of the tub.

7. The machine according to claim 5, wherein the counterweight comprises a cavity in which the generator is positioned.

8. The machine according to claim 1, wherein the generator comprises a stator core, at least one winding wound on the stator core, and a magnet movably associated with said stator core, wherein a movement of said magnet relative to the stator core can generate a magnetic flux variation within said stator core which can induce the passage of an electric current in the at least one winding.

9. The machine according to claim 8 wherein the stator core is shaped like a ring.

10. The machine according to claim 9, wherein the ring has a rectangular or square or circular or elliptic cross-section.

11. The machine according to claim 9, wherein the magnet is positioned at a center of the ring of said stator core.

12. The machine according to claim 9, wherein a first winding is wound on an external lateral surface of the ring of said core.

13. A machine according to claim 12, wherein a second winding is wound around the ring.

14. The machine according to claim 13, wherein the generator comprises four second windings, each one being wound around approximately one fourth of a length of the ring of said stator core.

15. The machine according to claim 8, comprising a support rigidly connected to said stator core and so shaped as to surmount said core, and wherein the magnet is movably connected with said support.

16. The machine according to claim 15, wherein the generator comprises a first elastic constraining element connecting the magnet with the support.

17. The machine according to any one of claim 8, wherein the generator comprises at least one second elastic constraining element connecting the magnet with the stator core.

18. The machine according to claim 1, comprising an electric energy accumulator electrically coupled to the generator and storing the electric charge carried by the electric current generated by the generator.

19. The machine of claim 18 wherein the electric energy accumulator comprises one or more batteries and/or one or more supercapacitors.

20. The machine according to claim 1, wherein the electric current generated by the generator is used by the machine itself.

21. The machine according to claim 1, comprising a current inverter which is capable of generating an alternating electric current by directly or indirectly using the electric current generated by the generator.

22. The machine according to claim 21, wherein the alternating electric current is used for supplying power to an electric load external to the machine.

23. The machine according to claim 1, comprising a voltage output connector, particularly for direct voltage, for the purpose of supplying power voltage to electric devices external to the machine.

24. The machine according to claim 1 further comprising a constraining assembly coupling the oscillating assembly to the frame wherein the constraining assembly allows for oscillating movement of the oscillating assembly relative to the frame.

25. The machine according to claim 24, wherein the constraining assembly comprises a suspension.

26. The machine according to claim 25, wherein the suspension comprises at least one of a spring or a damper coupling the tub to the frame.

\* \* \* \* \*